(12) United States Patent
Benjamin

(10) Patent No.: US 7,624,167 B1
(45) Date of Patent: Nov. 24, 2009

(54) METHOD AND APPARATUS FOR ARRANGING DISTRIBUTED SYSTEM TOPOLOGY AMONG A PLURALITY OF NETWORK MANAGERS

(75) Inventor: Shai Benjamin, Mevaseret Zion (IL)

(73) Assignee: EMC Corporation, Hopkinton, MA (US)

(*) Notice: Subject to any disclaimer, the term of this patent is extended or adjusted under 35 U.S.C. 154(b) by 773 days.

(21) Appl. No.: 11/052,395

(22) Filed: Feb. 7, 2005

Related U.S. Application Data

(60) Provisional application No. 60/544,526, filed on Feb. 13, 2004.

(51) Int. Cl.
*G06F 15/173* (2006.01)
(52) U.S. Cl. .................................. 709/223; 709/202
(58) Field of Classification Search ......... 709/201–202, 709/223–226
See application file for complete search history.

(56) References Cited

U.S. PATENT DOCUMENTS

2003/0208523 A1* 11/2003 Gopalan et al. ............. 709/201

* cited by examiner

*Primary Examiner*—Yasin M Barqadle
(74) *Attorney, Agent, or Firm*—Krishnendu Gupta; Joseph D'Angelo

(57) ABSTRACT

A method and apparatus is disclosed for assigning a plurality agents associated with and monitoring devices to at least one manager in a distributed system, wherein the distributed system is arranged into a plurality of groups, each group associated with a manager, the method comprising the steps of identifying sets of agents wherein each set of agents includes at least one common association, assigning each of the sets of agents to at least one manager and, iteratively improving the assignment of each of the sets of agents until at least one desired criterion is substantially achieved. In one aspect, the sets of agents are continuously assigned until the total number of agents assigned to a manger is less than a predetermined number. In another aspect, the sets of agents are assigned until the total number of agent repetitions is less than a predetermined number. In still another aspect, the assigning of the sets of agents is continued until the maximum difference in the number of agents between any two partitions is less than a predetermined number.

54 Claims, 11 Drawing Sheets

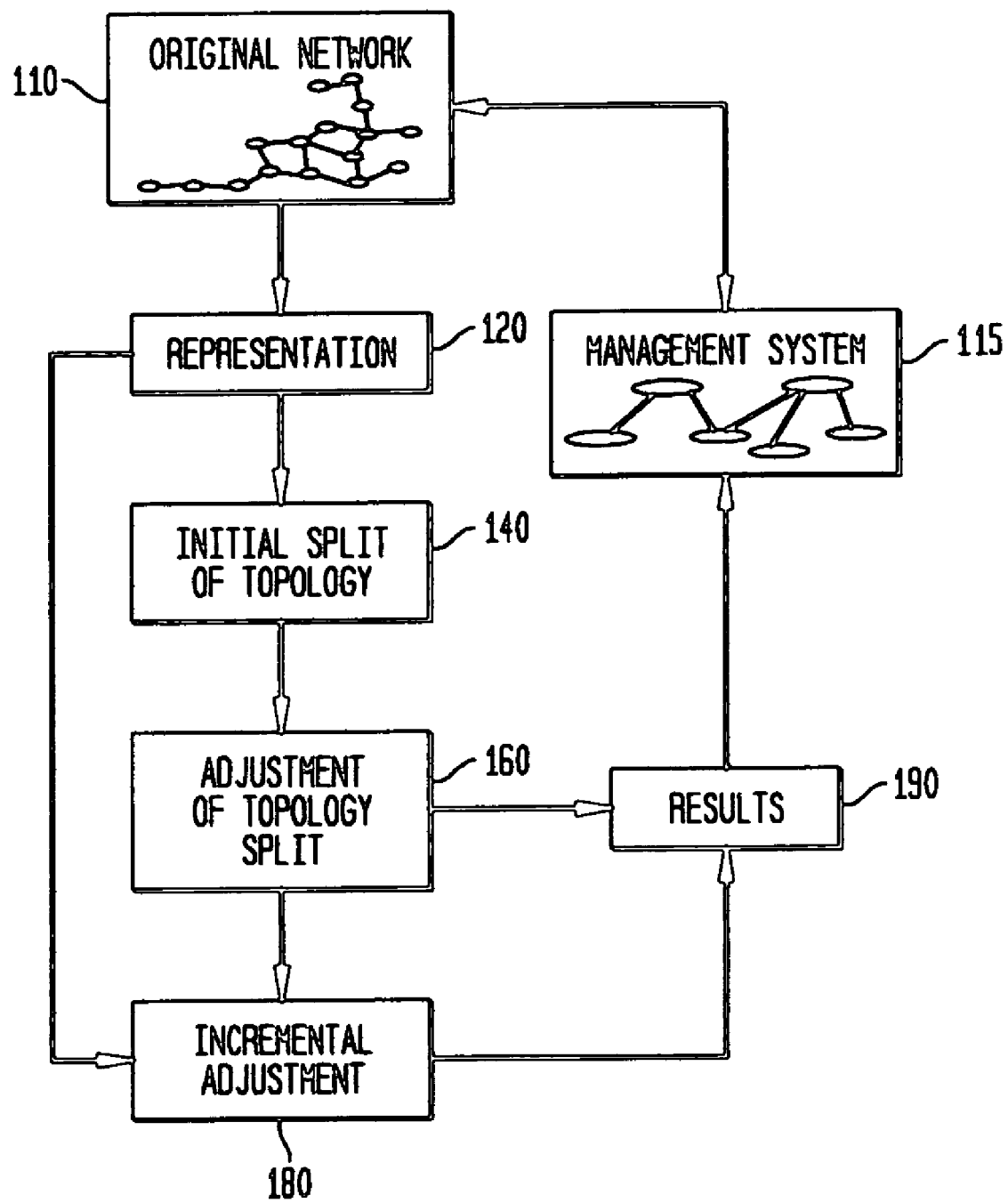

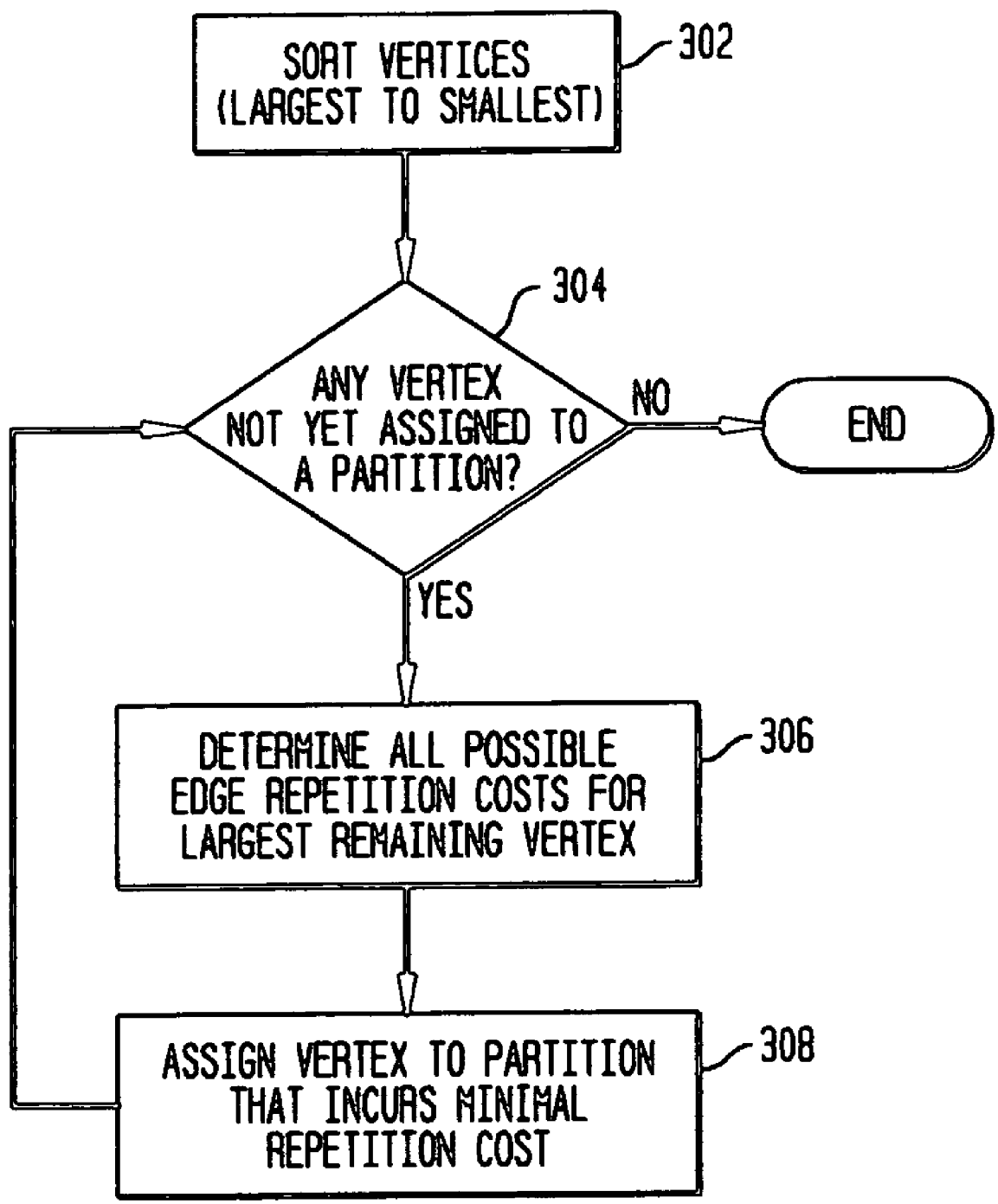

METHOD AND APPARATUS FOR ARRANGING DISTRIBUTED SYSTEM TOPOLOGY AMONG A PLURALITY OF NETWORK MANAGERS

CLAIM OF PRIORITY

This application claims the benefit, pursuant to 35 USC §119(e), of U.S. Provisional Patent Application No. 60/544, 526, filed Feb. 13, 2004, the contents of which are incorporated by reference herein.

FIELD OF THE INVENTION

The present invention relates generally to networks and distributed systems and more particularly, to methods and apparatus for organizing distributing system components for analyzing and managing the distributed system.

BACKGROUND OF THE INVENTION

A management system is typically used to manage (e.g., monitor and control) the operation of ever increasing networked systems and networks of networked systems. A distributed system (e.g., a computer or communication system) generally includes many individual components (e.g., nodes or devices), which may be implemented using both hardware and software elements. The individual devices, and the relationships between them, conventionally define the "topology" of a distributed system.

A management system typically includes a plurality of agents that are assigned to a centralized manager. The agents of the management system are used to monitor, control, and otherwise influence the behavior of the devices or elements of the managed distributed system. These agents may be any suitable software or hardware element that is capable of collecting information, e.g., statistics, about the behavior of a device and/or enacting required changes to the device. Moreover, any number of the components in a distributed system may be associated with one or more agents, although each component for which monitoring and/or control is desired must be associated with at least one agent.

A centralized manager is used to coordinate the operation of the agents in the management system. As is the case with agents, the centralized manager may be any suitable software or hardware element, although it must be capable of performing tasks required (or useful) to monitor or control a distributed system, such as analysis (performance or fault), configuration changes, etc. In many types of management systems, the agents run on or in the same network of the respective network devices they are monitoring and/or controlling while the manager remotely collects information from one or more agents to perform its task as a whole.

It is important to note that the agents are not required to be on the same network as the managed device or on the device itself. The distinction between the manager and the agent is in their functionality (e.g., monitoring, control or analysis) rather than their location relative to the devices.

A limitation on the performance of management systems has traditionally been size of the network or the system being managed. Large systems, that have components or elements distributed over a wide geographic area, can present an unsustainable computational burden on the management system. One approach often used to alleviate the burden on the management system of a distributed system, and to thus improve scalability, is to create a distributed-architecture management system. In a distributed-architecture management system, a single, centralized, manager is replaced by a plurality of managers, each of which oversees a subset of the agents in the distributed network or system. Each manager is associated with a respective partition or subset of the distributed architecture management system.

Current solutions to the problem of dividing the agents of a management system (and their corresponding devices) into subsets for assignment to respective managers in a distributed-architecture management system are often not adequate. Many current solutions use ad-hoc methods, typically involving manual configuration of the management system. Such methods, however, suffer from several drawbacks. For example, the resulting division may not provide an accurate result as each manager needs to have enough information to be able to correlate events in the associated devices managed as well as causally-related devices it may not be managing. For example, a failure of a link may go undetected if the two devices adjacent to the links are assigned to different managers. Secondly, the process is inefficient. In the case of very large networks, with thousands of devices, it is time consuming to assign devices to managers in order to accomplish preset goals. For example, if one wants to minimize the number of devices that need to be assigned to more than one manager, it may be difficult to develop an efficient algorithm to perform an efficient assignment for very large networks. Lastly, the process is not scalable as it is difficult to develop an algorithm that can accomplish preset goals while being scalable in the number of agents.

In view of the foregoing, it would be desirable to provide a systematic approach for splitting the topology of a system in order to assign agents to one or more managers in a distributed-architecture manager system.

SUMMARY OF THE INVENTION

A method and apparatus for assigning a plurality of agents, associated with and monitoring the devices, to at least one manager in a distributed system, wherein the distributed system is arranged into a plurality of groups, each group associated with a manager, the method comprising the steps of identifying sets of agents wherein each set of agents includes at least one common association, assigning each set of agents to at least one manager and, iteratively improving the assignment of each of the sets of agents to the managers until at least one desired criterion is substantially achieved. In one aspect, the sets of agents are continuously assigned until the total number of agents assigned to a manger is less than a predetermined number. In another aspect, the sets of agents are assigned until the total number of agent repetitions is less than a predetermined number. In still another aspect, the assigning of sets of agents is continued until the maximum difference in the number of agents between any two groups is less than a predetermined number.

BRIEF DESCRIPTION OF THE FIGURES

FIG. 1 illustrates a block diagram of a process flow for a network topology split in accordance with the principles of the present invention;

FIG. 3 illustrates a flow chart of an exemplary process in accordance with one aspect of the present invention;

Figure 2A:
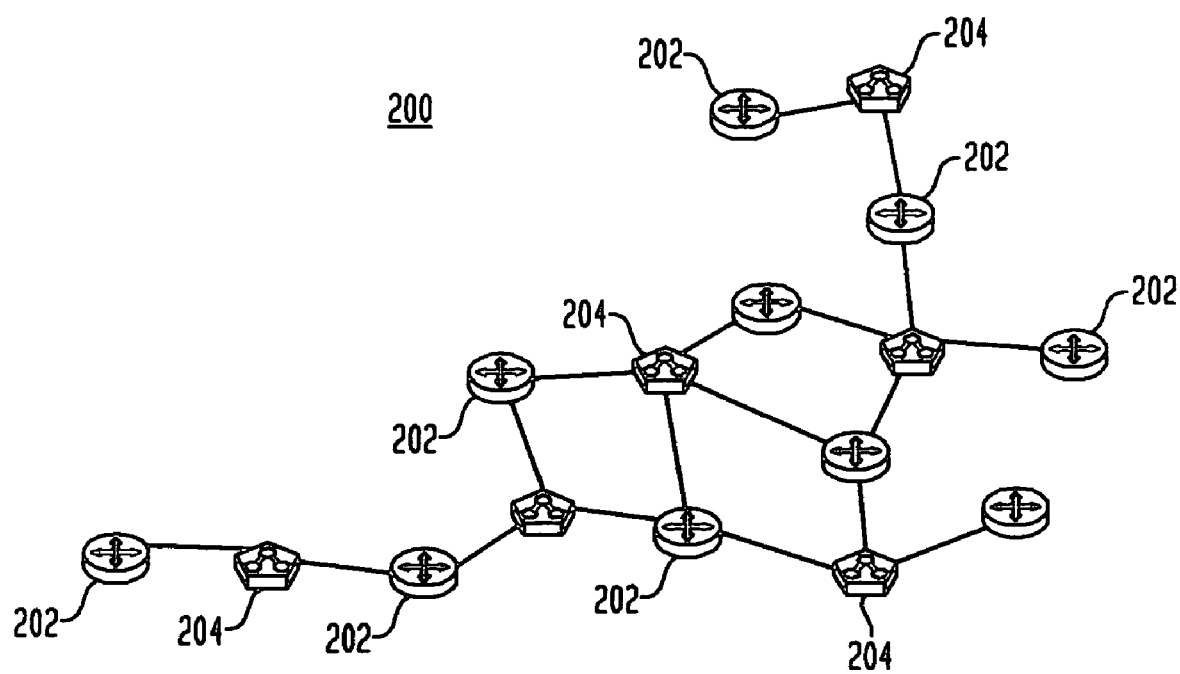
FIG. 2A illustrates a conventional network diagram to which the principles of the present invention may be applied.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a block diagram 100 of an exemplary process for organizing, allocating or splitting a network topology to be managed by a distributed management system. The original network system topology, shown in block 110, is provided to block 120, which creates a representation, referred to herein as a model, of the network system topology. As would be recognized, model generation may be automated, using known strategies, or it may be generated manually.

The generated model is then provided to block 140, wherein an initial assignment or split of the network topology is performed. The initially split topology is then provided to block 150 where adjustments are applied to the topology based on known or desired criterion (criteria). The resultant split topology, as shown in block 190, is provided to the management system 115, which utilizes the determined split topology for the management functions.

Incremental changes to the network may also be captured and modeled, and the revised model provided to block 180 to incorporate incremental updates. These incremental updates may then be used by the management system when changes to the original network have been made.

FIG. 2A illustrates an exemplary network diagram 200 for which the process of topology splitting according to the principles of the present invention may be employed. In this exemplary case, the icons 202 represent nodes or devices, such as routers, switches, and the like, of the network. The icons 204 together with their respective adjacent links represent physical or logical connectivity between the devices 202. Icons 204 may represent connectivity entity, such as data carrier links, IP network connections, etc., and the lines shown may represent, for example, the interfaces between data carrier links. It should be noted that the term "agent" is used to describe any management agent or the network component(s) (e.g., nodes, devices, software components, subsystems, etc.) that the agents manages. The term agent and device is, thus, used interchangeably, herein. Thus, in this illustrative case, icons 202 shown in FIG. 2a may also represent agents that are managed by the management system.

Figure 2B:
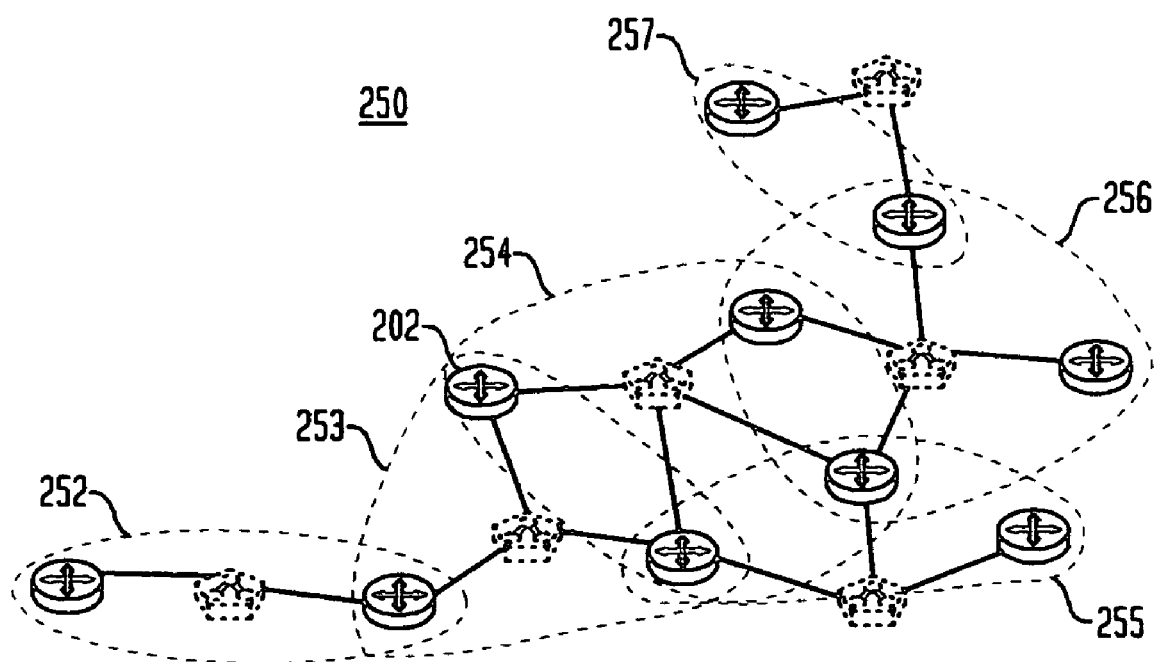
FIG. 2B illustrates a conventional representation of the network shown in FIG. 2A.

FIG. 2B illustrates an example of modeling the network 200 shown in FIG. 2a. In this illustrative example, model 250 represents each connectivity entity 204 of the network 200 and adjacent network devices (or agents) as a vertex and every device (or agent) 202 that belongs to one or more vertices as an edge. In one aspect of the invention, which is discussed herein, a hyper-graph model representation is used to describe the principles of the present invention. As the model representation is discussed with regard to graph theory, the principles and terminology of graph theory, i.e., vertices and edges, are used herein. Further, the term "hyper-graph" refers to a graph that includes hyper-vertices and hyper-edges. A hyper-vertex is a vertex in a hyper-graph and a hyper-edge is a non-empty subset of any size of the vertices in the hyper-graph. Further, in a graph, an edge is known to represent the connection between two vertices, whereas in a hyper-graph, a hyper-edge can have more than two vertices. Hence, for the discussion herein, the term "edge" will refer to an edge or hyper-edge, while the terms "vertex" and "vertices" will refer to a vertex or hyper-vertex, and vertices or hyper-vertices, respectively. It will also be understood that the term "vertices" simply refers to more than one "vertex."

The hyper-graph model representation of the network 200 shown in FIG. 2A, includes six vertices 252-257, which are denoted by dashed lines. Further, the icons 202 that belong to one or more of these six vertices represent edges. The occurrence of icon 202 in a vertex of FIG. 2B implies that the corresponding edge is incident to or associated with that vertex.

Hyper-graph model representation is advantageous in properly assigning agents to managers while satisfying required goals. However, one skilled in the art would recognize that the invention is not limited to such a model. One may define any model that can capture the dependencies among agents in order to satisfy pre-established goals for the assignment in accordance with the principles of the invention.

It would be appreciated that the construction of a model abstraction of a network, such as the one shown in FIG. 2B, ensures that known agents are assigned to the same manager, provided that each vertex (and its agents) is assigned to a single manager. Nevertheless, some agents may be present in multiple vertices (i.e., replicated) and may be assigned to more than one manager.

FIG. 3 illustrates an exemplary process 300 for determining an initial assignment or split of network represented as a hyper-graph in accordance with the principles of the invention, as is represented by block 140 (FIG. 1). In this illustrate process, k randomly chosen empty partitions $P_1, P_2, \ldots P_k$ are associated with the creation of the model representation 250. At block 302, the vertices are sorted in decreasing order of size, where size represents the number of agents of network 200 that the vertex contains.

At block 304, a determination is made whether there are any remaining vertices that need to be assigned to a partition. If answer is negative, then processing is completed. However, if the answer is in the affirmative, then at block 306, vertices are marked for assignment and examined based on at least one known criterion. In one aspect of the invention, the processing represented by block 306 may be such that the total number of instances of the agents (i.e., agent repetition) is minimal. In another aspect of the invention, the processing represented by block 306 may be such that the largest edge repetition cost, r(e), over all k possible vertex assignments is minimized. In still another aspect, the processing represented by block 306 may be such that the number of elements within each partition $P_1, P_2, \ldots P_k$ is substantially equal. This may be expressed, for example, as the difference in the number of elements between two groups is less than a predetermined value. As would be appreciated, these criteria may be used singularly or in combination to provide an initial organization or split of the network topology.

At block 308 the vertices are then assigned to partitions based on selected use of one or more of the above referred to criteria.

The criteria used to distribute or replicate agents of a network to groups, whether in the initial assignment (FIG. 3) or re-assignment (as explained with regard to FIG. 4) may be more formally expressed as:

Let network N be represented or modeled by the hyper-graph H that has n vertices $\Omega = \{V_1, V_2, \ldots, V_n\}$, m edges $E = \{e_1, e_2, \ldots, e_m\}$, a number of subsets, or partitions k (corresponding to k managers), a computation, or function $f$ being performed by the network, and a predetermined size $\epsilon$. Additionally, noting that edges correspond to agents and vertices are dependencies between agents, following conditions may further be assumed:

1. the vertices of hyper-graph H have the properties wherein each of the vertices in the set of $\Omega$ is a subset of E, and includes at least one of edges $e_1, e_2, \ldots, e_n$ $$\forall V \in \Omega \cdot V \subseteq E, V \neq \phi;$$

2. $\Pi = \{P_1, P_2, \ldots, P_k\}$ is a k-partition of $\Omega$, where each element of $\Pi$ is called a subset, or partition, and each partition of $\Pi$ is a subset of $\Omega$, while the union of the k partitions in $\Pi$ is equal to $\Omega$, and no vertex of $\Omega$ is assigned to more than one partition which may be expressed as:

$$P_i \subseteq \Omega, P_1 \cup P_2 \cup \ldots \cup P_k = \Omega \text{ and } P_i \cap P_j = \phi, i \neq j, 1 \leq i, j \leq l;$$

3. the edge repetition cost, r(e), for a given edge e, is the number of partitions P that contain a vertex V that is incident on e (i.e., the number of partitions that contain vertices that in turn contain edge e) and may be expressed as:

$$r(e) = |\{P \Pi : \exists V, V \in P, e \in V\}|;$$

4. the total number of edges, s(P), in the union of vertices of P, which is the number of edges incident on any node in P, may be expressed as:

$$s(P) = |\{e \in E : \exists V, V \in P, e \in V\}|.$$

A first criterion for determining assignment of agents to managers may require that the total number of repetitions of instances of the same agent in different groups, wherein each group is assigned a manager, is as small as possible. This criterion may be expressed as:

$$\min\{R(\Pi) = \Sigma_{e \in E} r(e)\}.$$

A second criterion for determining assignment of agents to managers may require that the distributed computation or analysis performed by the managers achieves the same global result $f(G_r)$ as if all agents were assigned to a centralized manager. This may be expressed as:

$$f(G_r) = g(f(P_1), f(P_2) \ldots f(P_k))$$

where $G_r$ is the set of all devices.

As an example, the function, $f$, may represent a process of event correlation and the function, g( ... ), may represent a function that takes the correlation result in different pieces of the hyper-graph. In this case, the result of each correlation will have the same result as that obtained if the hyper-graph topology were not split among a plurality of groups.

A third criterion for determining assignment of agents to managers may require that the size of the subsets (i.e., the groups) be substantially the same (i.e., the difference in number of elements comparing any two groups should be no more than $\epsilon$). This criterion may be expressed as:

$$\forall P, Q \in \Pi, P \neq Q |s(P) - S(Q)| \leq \epsilon$$

It will be understood, however, that the criteria shown herein are for illustrative purposes only, and one skilled in the arts would have sufficient knowledge from the teachings herein to impose additional and/or different criteria on the assignment of agents to managers. In particular, other criteria may be required to satisfy a variety of objectives, and are considered to be within the scope of the principles of the present invention.

For example, if there exists multiple partitions to which a vertex may be assigned e.g., a tie between two or more partitions, then a secondary criterion may be invoked wherein vertex assignment is preferably made to that partition that includes the smallest total number of agents. If there is a further tie (i.e., there are two or more partitions with the same, smallest number of total agents), the vertex may be assigned to one of these partitions arbitrarily, or the vertex may be assigned to one of the partitions based on other secondary criterion.

Similarly, when each subsequent vertex that is to be assigned to a partition is connected by at least one agent to the previously assigned vertex, the steps described above may result in all vertices being assigned to a single partition in order to avoid repetition costs. Accordingly, it may be desirable to add additional secondary criterion in the assignment of vertices to partitions. For example, the assignment of a vertex to a partition may be disallowed even if such an assignment would result in a smaller repetition cost, if the assignment would create too great a disparity in the sizes of the various partitions.

Returning to the process shown, after a vertex has been assigned to one of the groups in block 308, the process returns to step 304 to determine whether additional vertices remain to be assigned. Once it is determined in step 304 that all of the vertices have been assigned, the initial assignment of vertices, i.e., split of the network topology, is completed.

It will be understood that the particular steps described above are for purposes of illustration only, and not of limitation. In particular, it is contemplated that variations on the steps described above may be used in accordance with the principles of the present invention for assigning vertices. For example, in other embodiments of the invention, the vertices may be sorted (and assigned) in increasing rather than decreasing order. Alternatively, the vertices may be sorted (and assigned) in another, e.g., random, sequence.

Figure 4:
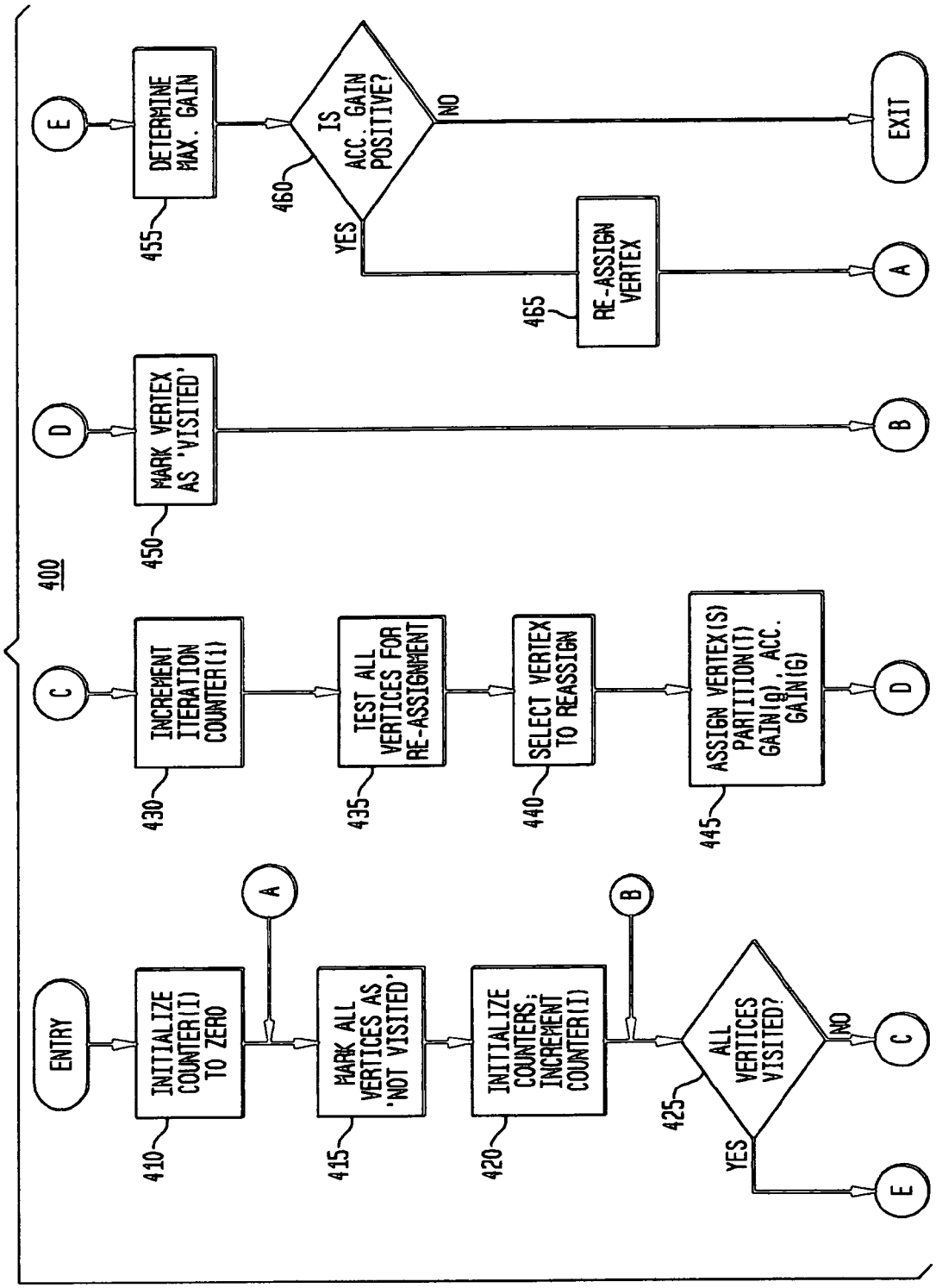
FIG. 4 illustrates a flow chart of an exemplary process in accordance with a second aspect of the present invention.
Figure 5:
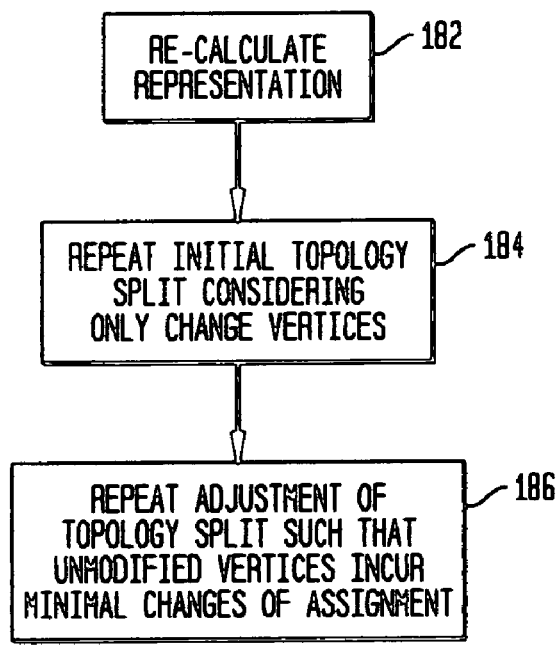
FIG. 5 illustrates a flow chart of an exemplary process in accordance with a third aspect of the present invention.

FIG. 4 illustrates an exemplary process 400 for balancing or adjusting the assignment of vertices (agents/managers) in accordance with the principles of the invention, as represented by block 180 (FIG. 1). In this exemplary process, potential changes of vertex assignment are evaluated to determine whether a change provides a solution that satisfies at least one desired criterion (criteria). One method for performing the balancing or adjustment of the assignment is the well-known Kernighan-Lin algorithm, which is described in "An Efficient Heuristic Procedure for Partitioning Graphs" by B. W. Kernighan and S. Lin in vol. 49 (February 1970), The Bell Systems Technical Journal, pages 291-307. However, the Kernighan/Lin algorithm is limited to graphs and assignments between two partitions. Process 400 shown herein represents a modification of the Kernighan/Lin algorithm as it applies to hyper-graphs and multi-partitions.

In the modified process shown, at block 410, an iteration number or counter I is initialized, e.g., set to zero. At block 415, all vertices in the network model representation are marked as "not visited." At block 420, the number of visited vertices (i) and the cumulative gain, referred to as $G^I(0)$, are both set to zero. At block 425, a determination is made whether all vertices have been visited. If the answer is in the negative, then the visited vertex number (i) is incremented at block 406. At block 435, a test of all the vertices for potential reassignment to another partition is made. At block 440, a vertex is selected for potential reassignment and at block 445 the selected vertex (vertices) is marked for assignment to partition (T) and a gain value (g) and an accumulated gain (G) are determined.

At block 450, the selected vertex is marked as "visited," and the processing continues at block 425.

Returning to the determination at block 425, if the answer is in the affirmative, then the cumulative gain (G) is used to identify the point at which the accumulated gain is maximized, while satisfying the at least one desired criterion (criteria). At block 460, a determination is made whether the value of the maximized gain is positive, zero, or negative from the previous value. If the maximized cumulative gain is zero or negative, the process is completed. However, if the maximized cumulative gain is positive, then at block 465, the vertices that contributed to the maximum cumulative gain are re-assigned to the designated partitions.

Processing then proceeds to block 415 where the processing is iteratively repeated using that configuration that achieved the highest accumulated gain while satisfying all the desired criteria until no additional increase in the gain value is achieved, e.g., maximized cumulative gain is zero or negative. In another aspect, (not shown), the processing may be repeated for a known number of iterations (1). In still another aspect, processing may be repeated based on time or other processing constraints.

In another aspect of the invention (not shown), when the cumulative gain is zero (0), the selected vertices may be re-assigned to provide the least difference in the number of edges in each new partition.

In addition to the criteria for splitting the network topology as discussed, according to embodiments of the present invention, the type of analysis being performed by the managers may be selected as a criterion upon which agents are assigned to one or more managers. For example, it may be required that agents associated with directly connected or associated network devices be assigned to the same manager. Such a criterion is particularly important, for example, when each manager needs to independently perform analysis, such as event correlation, based on the agent information. For example, the identification of the root-cause of a problem needs to take into account the information from all dependent, and/or directly connected network devices. Root cause analysis is more fully discussed in commonly-owned U.S. patent application Ser. No. 10/400,718, now U.S. Pat. No. 6,868,367 and U.S. Pat. Nos. 5,528,516, 5,661,668 and 6,249,755, the contents of which are incorporated by reference herein.

Figure 6A:
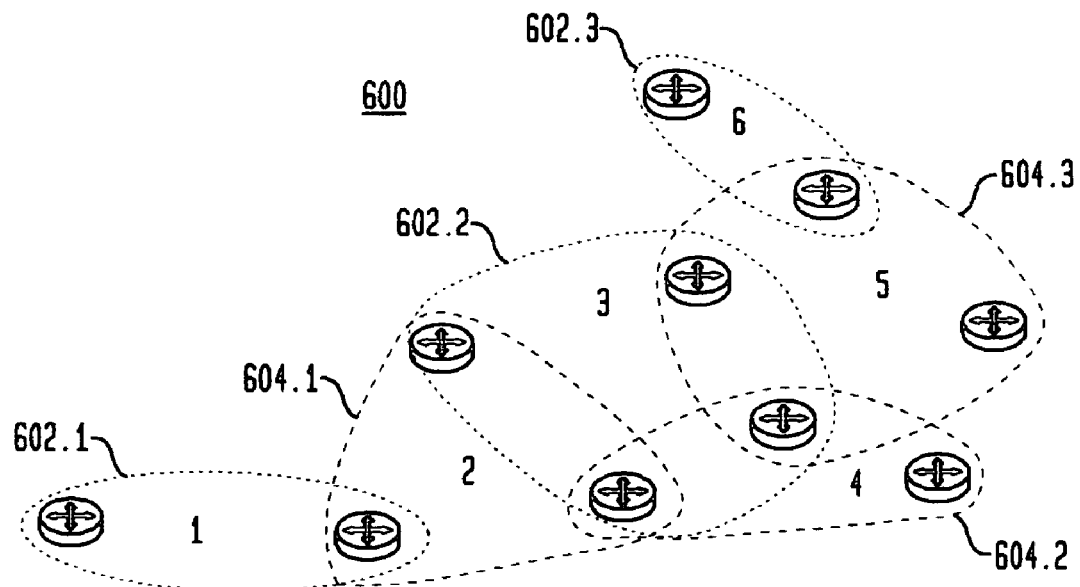
FIGS. 6A-6D collectively illustrate a first example of assigning agents in accordance with the principles of the present invention.

Examples of the application of the present invention are now described with regard to FIGS. 6A-6D, and 7A-7D. FIG. 6A depicts an example of an initial topology split for a k=2-partition of the network shown in FIG. 2a and modeled in FIG. 2b subject to the criteria that the difference in the number of elements between any two partitions should be no more than a predetermined size ($\epsilon=2$). In this illustrative example, dotted lines represent the vertices in a first partition, i.e., $V_1$, 602.1, $V_3$, 602.2 and $V_6$, 602.3 and dashed lines represent vertices in a second partition, i.e., $V_2$, 604.1, $V_4$, 604.2 and $V_5$, 604.3. The partitions may be expressed as:

$$P_1=\{V_1,V_3,V_6\} \text{ and } P_2=\{V_2,V_4,V_5\}.$$

In the illustrative example, six (6) agent repetitions are shown. For example, one element of vertex $V_1$ is also included in vertex $V_2$ (1 repetition) and two elements of vertex $V_2$ are also included in vertex $V_3$ (2 repetitions).

Figure 6B:
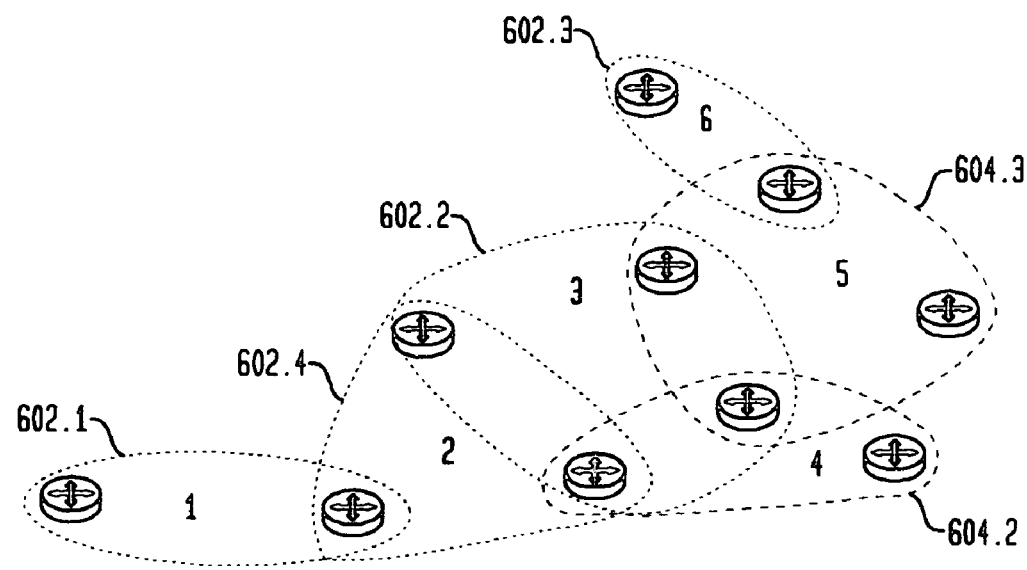
Figure 6C:
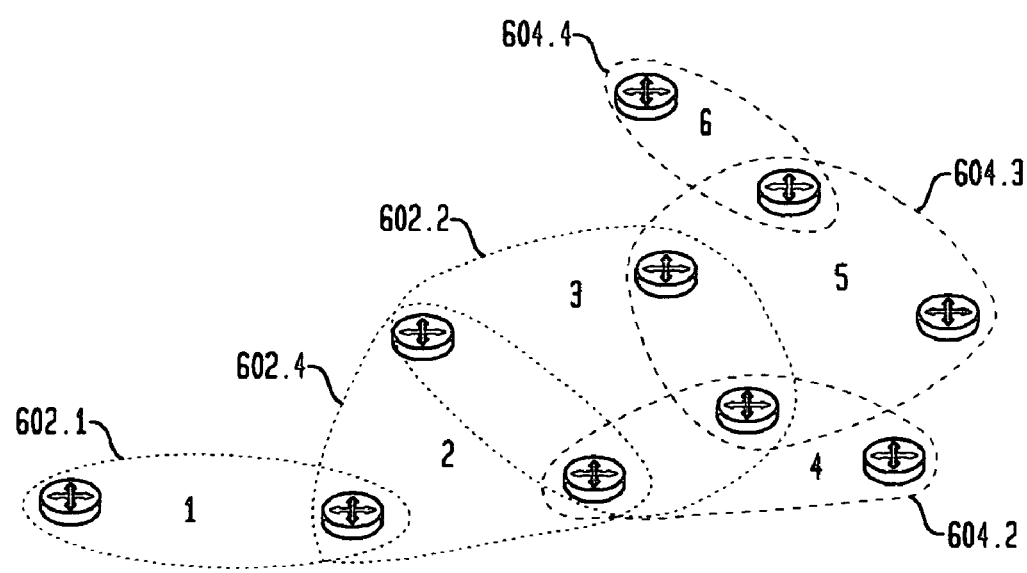
Figure 6D:
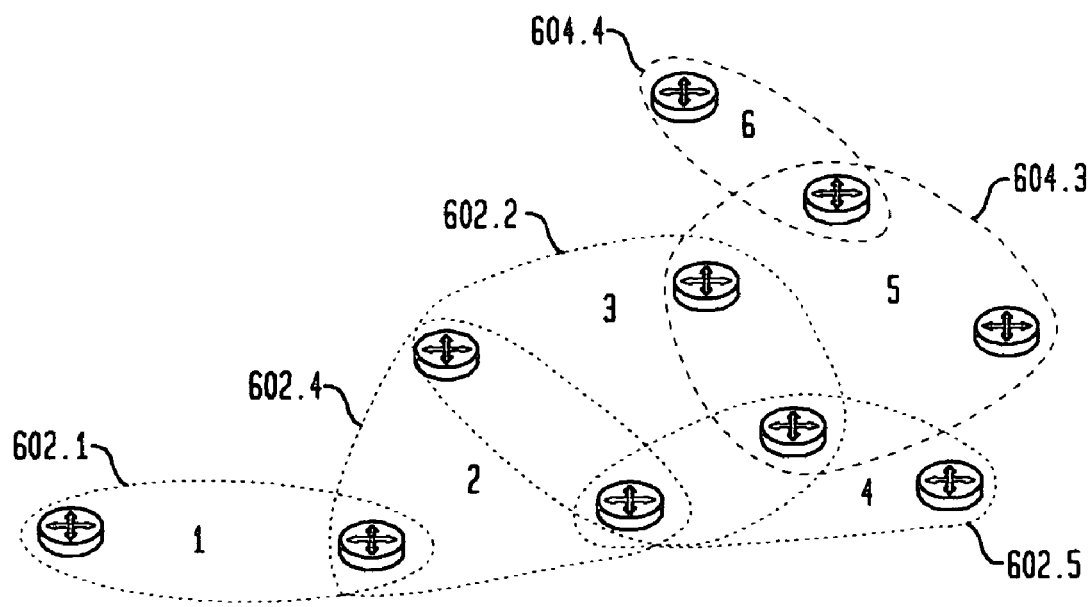

The results of adjusting the initial split topology shown in FIG. 6a utilizing the processing shown in FIG. 4, is tabulated in Table 1 and shown with reference to FIGS. 6b-6d, subject to the criteria that the total number of repetitions of instances of the same agent in different managers is as small as possible and the difference in the number of elements between any two partitions should be no more that $\epsilon=2$, i.e., $$\max_{P,Q \in \Pi^*}\{|s(P)-s(Q)|\}$$

TABLE 1

|  | Iteration 1 | | Iteration 2 | Iteration 3 | | |
|---|---|---|---|---|---|---|
| Vertex Iteration (i) | 1 | 2 | 1 | 1 | 2 | 3 |
| Iteration Number (I) | 1 | 1 | 2 | 3 | 3 | 3 |
| Vertex No. | 2 | 6 | 4 | 1 | 6 | 3 |
| Partition No. | 1 | 2 | 1 | 2 | 1 | 2 |
| Gain | 2 | 1 | 1 | −1 | −1 | −1 |
| Accumulated Gain | 2 | 3 | 1 | −1 | −2 | −3 |
| FIG. | 6B | 6C | 6D | | | |

Referring to Table 1 and FIGS. 6B-6D, the process for obtaining reassignment of vertices is now explained. The last row of Table 1 identifies the figure which shows the results after the step of the corresponding iteration is completed. For example, in the first iteration (I=1) and the first vertex iteration (i=1), vertex $V_2$, 604.1 (FIG. 6A) is marked for reassignment from partition 2 to partition I and a gain of 2 is obtained as nodes 610, 615, shown in FIG. 6A, are not replicated. FIG. 6B illustrates this reassignment of $V_2$, which is now referred to as 602.4. The partitioning may be represented as:

$$P_1=\{V_1,V_2,V_3,V_6\} \text{ and } P_2=\{V_4,V_5\}.$$

In a second iteration (i=2) vertex $V_6$ may similarly be selected as a vertex to be reassigned, from partition 1 to partition 2, and provides an improvement in gain. FIG. 6C illustrates the reassignment of $V_6$, which is now referred to as 604.4. The partitioning may be represented as:

$$P_1=\{V_1,V_2,V_3\} \text{ and } P_2=\{V_4,V_5,V_6\}.$$

The processing shown in FIG. 4 is iteratively repeated as each of remaining vertices, $V_3$, $V_1$, $V_4$ and $V_5$ are tested for possible re-assignment.

Although not shown, it would be recognized that the accumulated gain is maximized when vertex $V_3$ is reassigned from partition 1 to partition 2. However, when vertex $V_3$ is reassigned from partition 1 to partition 2 the difference in the number of elements between the two partitions exceeds the criterion, $\epsilon=2$, and, hence, this reassignment is not valid. In this case, the processing associated with the first iteration (I=1) is completed. The configuration obtained at the completion of the first iteration is then used as the configuration for a next (I=2) iteration.

In a second iteration (I=2), the gain is incremented when vertex $V_4$ is reassigned from partition 2 to partition 1. FIG. 6d illustrates the reassignment of $V_4$, which is now referred to as 602.5. The partitioning may be represented as:

$$P_1=\{V_1,V_2,V_3,V_4\} \text{ and } P_2=\{V_5,V_6\}.$$

Although not shown, it would be recognized that no further improvement in gain is achieved as the remaining vertices are attempted to be re-assigned. In a third iteration (I=3), which uses as a starting configuration the configuration obtained after the second iteration, no improvement in gain is achieved as vertices $V_1$, $V_6$, $V_3$ are attempted to be re-assigned and this attempt to re-assign the remaining vertices violates the desired criterion. Accordingly, no addition reassignment is possible and the reassignment processing is completed.

FIGS. 7A-7D illustrate a second example of the application of the present invention. As with the example shown in FIGS. 6a-6d, the criterion for reassigning elements is to minimize the term:

$$\max_{P,Q \in \Pi^*} \{|s(P)-s(Q)|\}$$

Figure 7A:
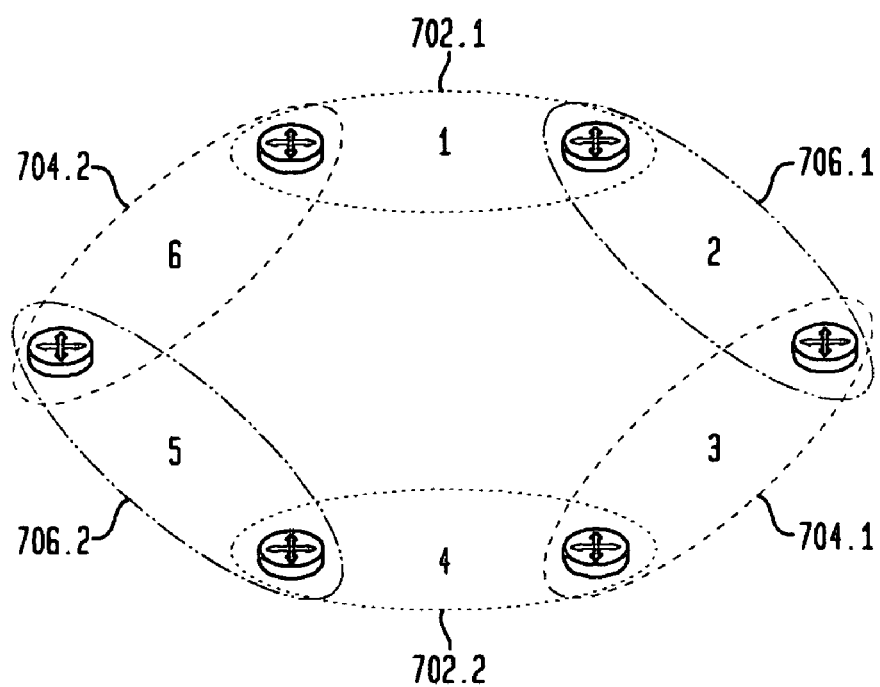
FIGS. 7A-7D collectively illustrate a second example of assigning agents in accordance with the principles of the present invention.

FIG. 7A illustrates the initial assignment of vertices in a network topology split into three partitions (k=3) represented by the hyper-graph 700. In this illustrative example, the network includes six hyper-nodes and six hyper-edges and the partitions contain vertices $V_1$ and $V_4$, represented by dotted lines 702.1 and 702.2, respectively, vertices $V_3$ and $V_6$, represented by dashed lines 704.1 and 704.2, respectively, and vertices $V_2$ and $V_5$, represented by dotted-dashed lines 706.1 and 706.1, respectively, subject to the criteria that the difference in the number of elements comparing any two partitions does not exceed $\epsilon=2$. In this case the partitions may, thus, be represented as:

$$P_1\{V_1,V_4\}, P_2=\{V_3,V_6\}, \text{ and } P_3=\{V_2,V_5\}.$$

However, as each vertex is included in at least two partitions, the total number of vertex replications is equal to 12 (R(Π)=12).

Now, subject to the additional criterion to minimize the number replications, or total number of edges, contained in the partitions, the assignment of vertices may be iteratively adjusted in accordance with the principles of the invention.

Figure 7B:
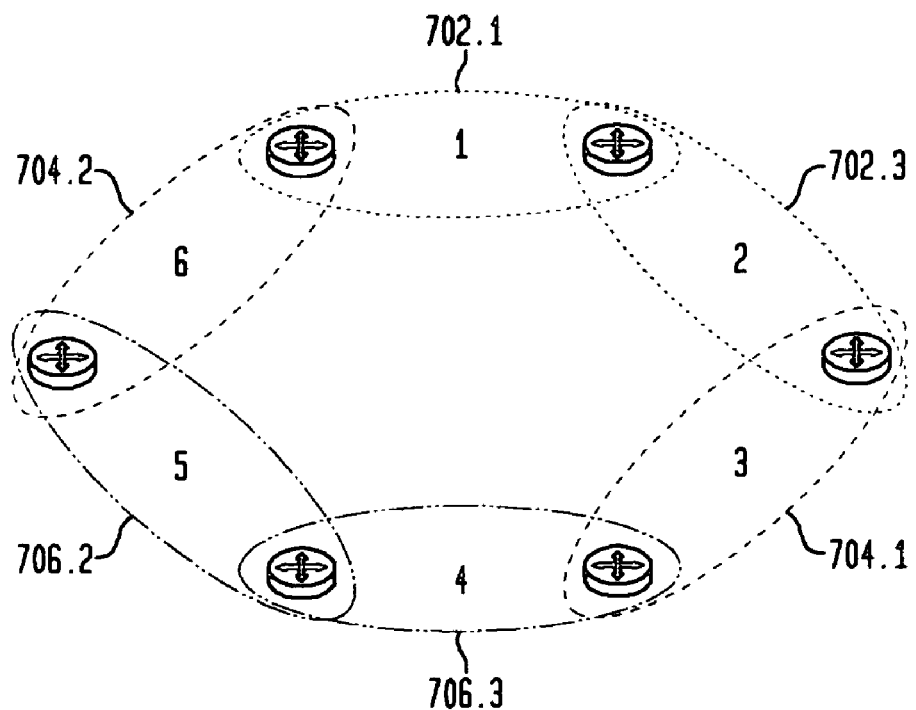

FIG. 7B illustrates the results of a first iteration (I=1) for the reassignment of vertices, and is represented as:

$$P_1=\{V_1,V_2\}, P_2=\{V_3,V_6\}, \text{ and } P_3=\{V_4,V_5\}.$$

In this case, the total number of vertex replications is equal to 8.

Figure 7C:
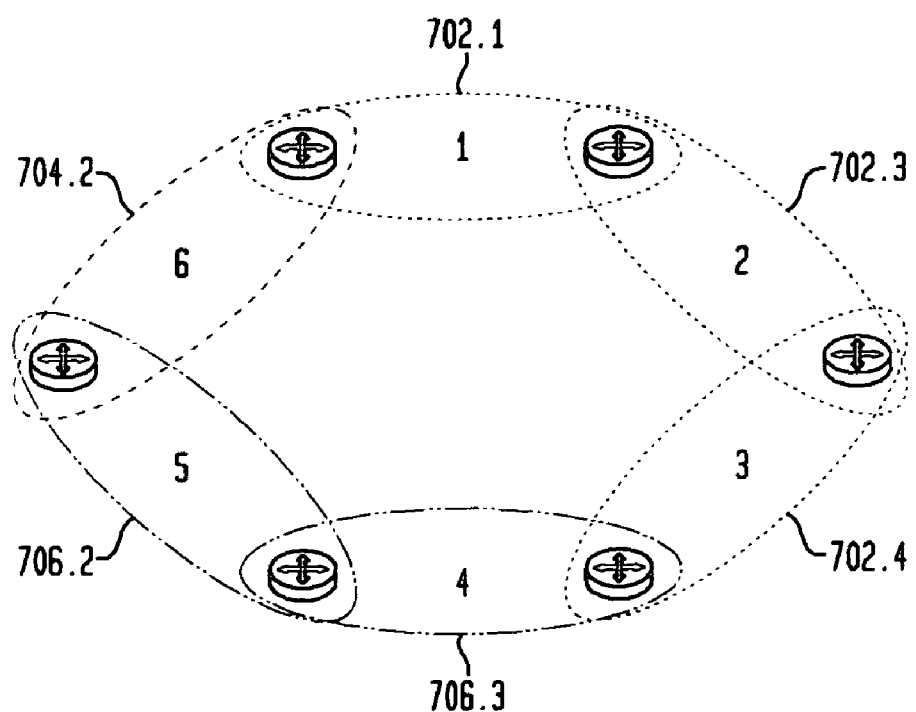

FIG. 7C illustrates the results of a second iteration (I=2) for the reassignment of vertices, and represented as:

$$P_1=\{V_1,V_2,V_3\}, P_2=\{V_6\}, \text{ and } P_3=\{V_4,V_5\}.$$

In this case, the total number of vertex replications is equal to 6.

Figure 7D:
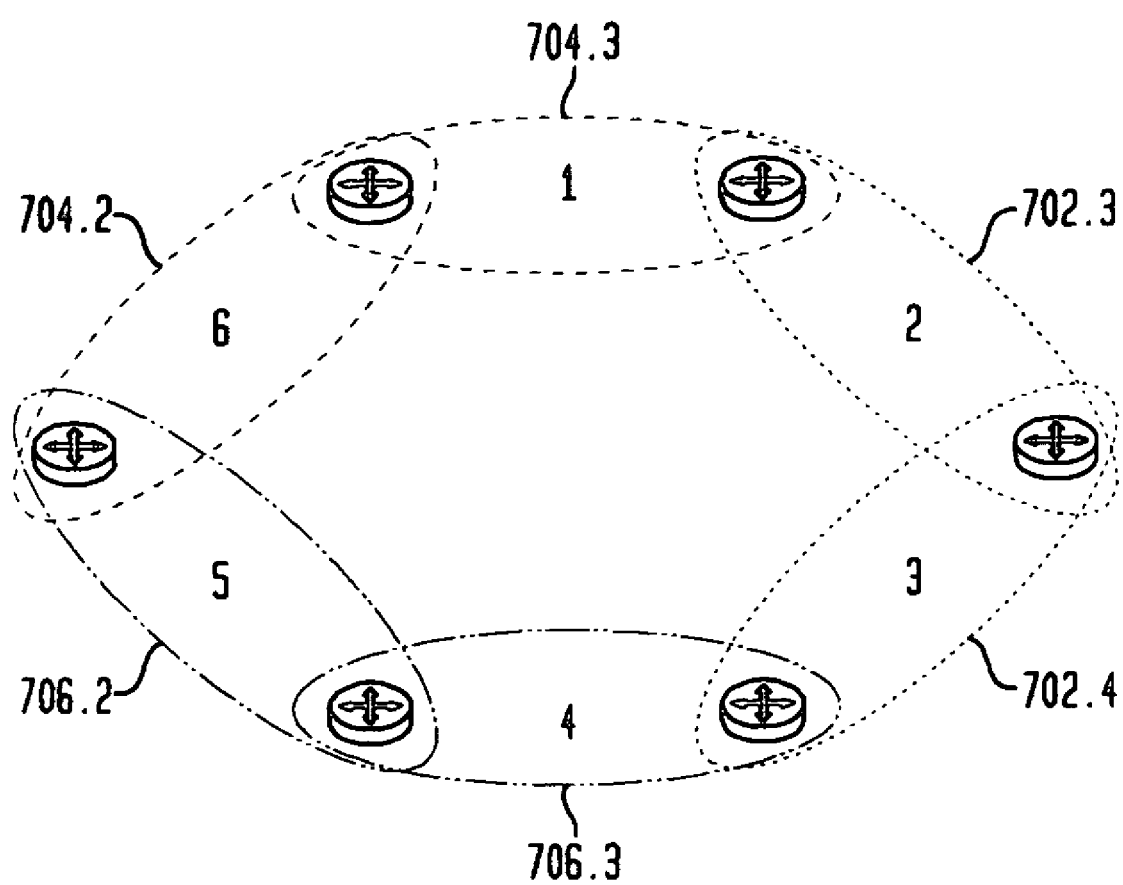

FIG. 7D illustrates the results of a third iteration (I=3) for reassigning vertices, and is represented as:

$$P_1=\{_2,V_3\}, P_2\{V_1,V_6\}, \text{ and } P_3\{V_4,V_5\}.$$

In this case, the total number of vertex replications is also equal to 6. Further, the number of vertices are more evenly distributed among the partitions, as:

$$\max_{P,Q \in \Pi^*} \{|s(P)-s(Q)|\}=0$$

In another aspect of the present invention, the assignment of vertices to partitions may be made dynamically to address the dynamic nature of the networks and distributed systems in general. (see block 180, FIG. 1). For example, when one or more devices are introduced in a network after an assignment of agents to managers has been established as described above or when one or more devices have been decommissioned, where a link presents losses, following an application crash, changes in network configurations, etc. When such changes occur, it may be undesirable for performance or administrative reasons to re-compute a new assignment of agents to managers for the resulting network using the described approach. In this case, it is advantageous to improve the efficiency of re-assigning agents to managers after dynamic changes in the network, agents, or managers using the current partition configuration.

In this case, in order to limit the number of reassignments of agents to managers, only newly introduced agents and respective connections are assigned at this step. Additionally, the assignment of agents that have been removed from the system, and their respective connections, are removed.

In another aspect of the present invention two different modes of operation may be considered; short-term and long-term. For example, as a short-term operation, a network topology may be incrementally updated in accordance with the processing described with regard to block 180, (FIG. 1), and uses the incremental updates while the computations of the long-term partition occurs in a background operation. The system operates in this short-term mode with temporary assignments, while the computations of the long-term partition take place in the background operation. The long-term partition is generated by applying the processing discussed with regard to FIG. 1.

It will also be appreciated by persons practiced in the art that the topology splitting process steps described above can be extended to handle additional constraints or criteria for assigning agents to managers. In one embodiment, for example, managers in a certain geographic region may be constrained to manage agents in the same region, or agents may be required to remain with a particular manager once initially assigned. In other cases, budgetary constraints can be used as a criterion to limit the number of agents assigned to a particular manager. Such situations can be handled by providing simple extensions on how the topology splitting process steps selects the partition where the edges are placed. Agents are assigned or re-assigned to managers only if the assignment satisfies the constraints. For example, if an agent A is required to be assigned to managers M1, M2, or M3, then only such assignments are allowed at each phase.

In other embodiments of the present invention the topology splitting process steps described above can be combined with correlation strategies (for example, codebook correlation, rule-based correlation, etc.) to filter duplication of conclusions (e.g., problem identification) from different managers. For example, two managers M1 and M2 may correlate information and independently conclude a specific agent (node, router, etc.) is faulty. The correlation engine can take the conclusions of M1 and M2 and combine them using some correlation strategy to identify duplicate conclusions. In this case, the correlation engine can identify that the two reported faults refer to the same agent and filter one.

In yet other embodiments of the present invention, which may also include a method or apparatus for generating the hyper-graph representation and for computing the subsets of hyper-graph vertices as described above, the resulting sets of vertices, the implied agents, and managers can be output in a human-readable format.

In addition, as previously mentioned, the invention is not limited by the particular type of network or system being represented by a model (e.g., hyper-graph). For example, a hyper-graph may be used to represent a computer network, where the vertices represent IP networks and the edges represent devices that connect the IP networks. As additional examples, the hyper-graph may be used to represent a computer network, where the vertices represent machines and the edges represent physical connections between the nodes, or a distributed application, where the vertices represent application components and the edges represent dependencies between them. The hyper-graph may, for example, be used to represent a distributed application layered over a physical network, where the vertices represent application components or physical nodes and the edges represent dependencies between them. It will be understood by persons practiced in the art that the invention is not limited by the type of system, or the particular aspects, being represented by the hyper-graph.

Figure 8:
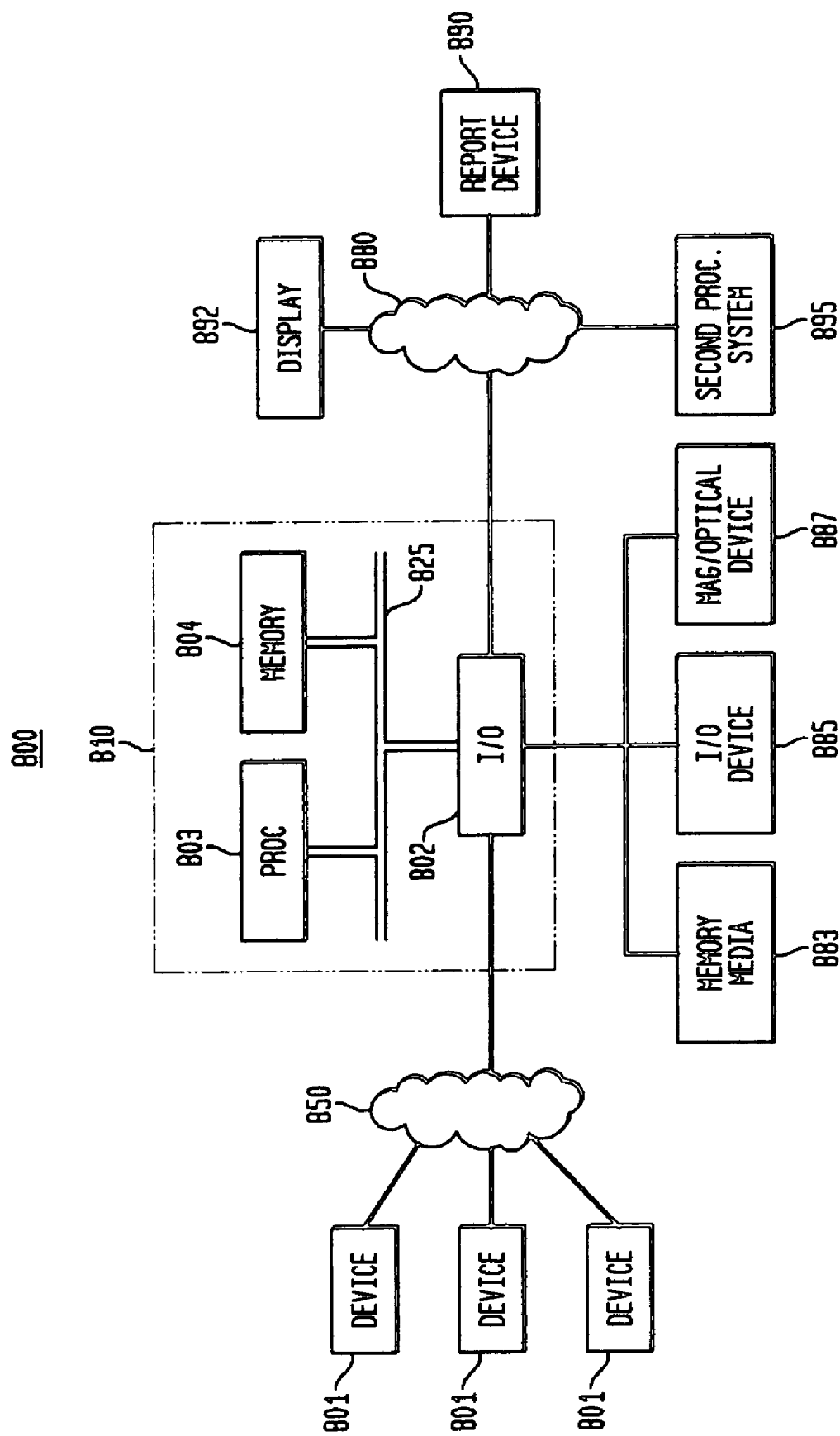
FIG. 8 illustrates a system for performing the processing shown herein.

FIG. 8 illustrates an exemplary embodiment of a system or apparatus 800 that may be used for implementing the principles of the present invention. System 800 includes processing unit 810 that may contain one or more input/output devices 802, processors 803 and memories 804. I/O devices 802 may access or receive information from one or more sources or devices 801. Sources or devices 801 may be devices such as routers, servers, computers, notebook computer, PDAs, cells phones or other devices suitable for transmitting and receiving information responsive to the processes shown herein. Devices 801 may have access over one or more network connections 850 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., intranets, as well as portions or combinations of these and other types of networks. Network 850 may also represent a communication bus, such as PCI, USB, Firewire, etc., that allows communication between device 801 and I/O device 802.

Input/output devices 802, processors 803 and memories 804 may communicate over a communication medium or network 825. Communication medium 825 may represent, for example, a bus, a communication network, one or more internal connections of a circuit, circuit card or other apparatus, as well as portions and combinations of these and other communication media. Input data from the devices 801 is processed in accordance with one or more programs that may be stored in memories 804 and executed by processors 803. Memory 804 may be selected preferably from semiconductor memories such as a Read-Only Memory (ROM), a Programmable ROM, a Random Access Memory, which is accessible through medium 825 or may be a cache memory in direct communication with processors 803. Processors 803 may be any means, such as general purpose or special purpose computing system, such as a laptop computer, desktop computer, a server, handheld computer, or may be a hardware configuration, such as dedicated logic circuit, or integrated circuit.

Processors 803 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium or downloaded via a network. The code may be read/downloaded from a memory medium 883, an I/O device 885 or magnetic or optical media, such as a floppy disk, a CD-ROM or a DVD, 887 or over a network connection. The downloaded computer readable code may be stored in memory 804 or executed directly by processor 803.

Information from device 801 received by I/O device 802, after processing in accordance with one or more software programs operable to perform the functions illustrated herein, may also be transmitted over network 880 to one or more output devices represented as display 892, reporting device 890, e.g., printer, or second processing system 895. Networks 825, 850 and 880 may be the same or different physical networks or may be different networks that operate on the same or different communication principles.

One practiced in the art will appreciate that the present invention can be practiced by other than the described embodiments, which are presented for the purposes of illustration and not limitation. Further, numerous specific details are set forth regarding methods and systems for topology splitting in a distributed system in order to provide an understanding of the present invention to those skilled in the art. It will be apparent to one versed in the art, however, that the present invention may be practiced without such specific detail, and that the scope of the invention is not limited in this manner. For example, it is contemplated that the methods described herein are applicable to any distributed computing task involving a group of distributed data collecting stations (implemented either in software or hardware) that report collected data to a distributed group of computing stations for the purpose of performing one or more computations on the data. Examples of systems that use a distributed architecture include, but are not limited to, sensor networks and satellite systems. Similarly, it will be understood by persons practiced in the art that any suitable modeling technique can be applied to obtain a model abstraction or representation of a network. Thus, any suitable method and/or apparatus that captures the desired relationships and gathers the necessary information from the network diagram may be used in the creation of the model representation.

What is claimed is:

1. A method for determining the assignment of a plurality of agents, the method comprising:
   identifying sets of agents of the plurality of agents, the plurality of agents and monitoring devices contained in a distributed system;
   associating at least one monitoring device of the monitoring devices in the distributed system with the identified set of agents, where each agent in a set of the sets of agents includes at least one common association; wherein the distributed system is arranged into a plurality of groups, each group associated with a manager;
   assigning the set of agents to at least one manager; and
   iteratively improving the assignment of each agent of the sets of agents to the managers until at least one desired assignment criterion is achieved, wherein the at least one criterion corresponds a to a measure of the managers ability to efficiently manage the agents; wherein the iteratively improving assignments involves testing for possible reassignments of the set of agents to the managers, calculating a gain for each possible reassignment, based on the gain for each possible assignment calculating a maximum cumulative gain, and reassigning the set of agents that contributed to the maximum cumulative gain; wherein the at least one desired assignment criterion is achieved when the maximum cumulative gain is not greater than zero and the at least one desired criterion is not violated.

2. The method of claim 1, wherein said common association represents network connectivity among the devices.

3. The method of claim 1, wherein the step of assigning each set of agents comprises the step of:
   satisfying a predetermined size criterion among the groups.

4. The method of claim 1, wherein the step of iteratively improving the assignment of the sets of agents comprises the step of:
   determining an improvement value, wherein said improvement value is a measure of a gain when at least one of the sets of agents is selectively re-assigned to another one of the managers.

5. The method of claim 1, wherein the step of iteratively improving the assignment of the sets of agents further comprises the step of:
   associating each set of agents with at least one manager wherein the at least one manager has the smallest total number of agents assigned thereto.

6. The method of claim 1, wherein the step of iteratively improving the assignment of the sets of agents further comprises the step of:
   associating each the sets of agent with at least one manager that results in the least amount of agent repetition.

7. The method of claim 1, wherein the desired criterion comprises the total number of agents assigned to more than one manger is less than a predetermined number.

8. The method of claim 1, wherein the desired criterion comprises the total number of agent repetitions is less than a predetermined number.

9. The method of claim 1, wherein the desired criterion comprises a distributed computation performed by managers would reach the same result as a single manager.

10. The method of claim 1, wherein the desired criterion comprises a predetermined size criterion among the groups.

11. The method of claim 1, wherein the desired criterion comprises determination of an elapsed predetermined period of time.

12. The method of claim 1, wherein the desired criterion comprises execution of a predetermined number of iterations.

13. The method of claim 1, further comprising the step of:
   re-assigning agents to managers in response to changes made in the distributed system.

14. The method of claim 13, wherein the re-assigning of the sets of agents to managers comprises the step of:
   assigning newly introduced agents to one or more managers.

15. The method of claim 13, wherein re-assigning agents to managers further comprises the step of:
   removing the assignment of any agent that has been removed from the distributed system.

16. The method of claim 13, wherein the re-assigning of the sets of agents to managers comprises the step of:
   calculating potential re-assignments of agents to managers in a background operation; and
   applying at least some of the calculated re-assignments to the assignment of agents.

17. The method of claim 1, further comprising the step of:
   displaying the agents and their respective assignments to managers in a human-readable format.

18. An apparatus for determining the assignment of a plurality of agents, the apparatus comprising:
   a processor in communication with a memory, said processor executing code for:
      identifying sets of agents of the plurality of agents, the plurality of agents and monitoring devices contained in a distributed system;
      associating at least one monitoring device of the monitoring devices in the distributed system with the identified set of agents, where each agent in a set of the sets of agents includes at least one common association; wherein the distributed system is arranged into a plurality of groups, each group associated with a manager;
      assigning each set of agents to at least one manager; and
      iteratively improving the assignment of each agent of the sets of agents to the managers until at least one desired assignment criterion is achieved, wherein the at least one criterion corresponds a to a measure of the managers ability to efficiently manage the agents; wherein the iteratively improving assignments involves testing for possible reassignments of the set of agents to the managers, calculating a gain for each possible reassignment, based on the gain for each possible assignment calculating a maximum cumulative gain, and reassigning the set of agents that contributed to the maximum cumulative gain; wherein the at least one desired assignment criterion is achieved when the maximum cumulative gain is not greater than zero and the at least one desired criterion is not violated.

19. The apparatus of claim 18, wherein said common association represents network connectivity among the devices.

20. The apparatus of claim 18, wherein the processor executing code for assigning each set of agents by:
   satisfying a predetermined size criterion among the groups.

21. The apparatus of claim 18, wherein the processor further executing code for iteratively improving the assignment of the sets of agents by:
   determining an improvement value, wherein said improvement value is a measure of a gain when at least one of the sets of agents is selectively re-assigned to another one of the managers.

22. The apparatus of claim 18, wherein the processor further executing code for improving the assignment of the sets of agents further by:
   associating each set of agents with at least one manager wherein the at least one manager has the smallest total number of agents assigned thereto.

23. The apparatus of claim 18, wherein the processor further executing code for improving the assignment of the sets of agents by:
   associating each of the sets of agent with at least one manager that results in the least amount of agent repetition.

24. The apparatus of claim 18, wherein the desired criterion comprises the total number of agents assigned to more than one manger is less than a predetermined number.

25. The apparatus of claim 18, wherein the desired criterion comprises the total number of agent repetitions is less than a predetermined number.

26. The apparatus of claim 18, wherein the desired criterion comprises a distributed computation performed by the managers reaches the same result as a single manager.

27. The apparatus of claim 18, wherein the desired criterion comprises a predetermined size criterion among the groups.

28. The apparatus of claim 18, wherein the desired criterion comprises the determination of an elapsed predetermined period of time.

29. The apparatus of claim 18, wherein the desired criterion comprises execution of a predetermined number of iterations.

30. The apparatus of claim 18, wherein the processor further executing code for:
   re-assigning agents to managers in response to changes made in the distributed system.

31. The apparatus of claim 30, wherein the processor further executing code for re-assigning of the sets of agents to managers by:
   assigning newly introduced agents to one or more managers.

32. The apparatus of claim 30, wherein the processor further executing code for re-assigning of the sets of agents to managers by:
   removing the assignment of any agent that has been removed from the distributed system.

33. The apparatus of claim 30, wherein the processor further executing code for re-assigning of the sets of agents to managers by:
  calculating potential re-assignments of agents to managers in a background operation; and
  applying at least some of the calculated re-assignments to the assignment of agents.

34. The apparatus of claim 18, wherein the processor further executing code for:
  displaying the agents and their respective assignments to managers in a human-readable format.

35. The apparatus of claim 18, further comprising:
  an input/output device in communication with the processor.

36. The apparatus of claim 18, wherein the code is stored in the memory.

37. The apparatus of claim 18, wherein the code is downloaded from an external device selected from the group consisting of: magnetic medium, optical medium, wired network connection, wireless network connection.

38. A computer-readable storage medium providing access to code, the code suitable for determining the assignment of a plurality of agents and monitoring devices contained in a distributed system to at least one manager, wherein the distributed system is arranged into a plurality of groups, each group associated with a manager, by providing instructions to a computing system for executing the steps of:
  identifying sets of agents of the plurality of agents, the plurality of agents and monitoring devices contained in a distributed system; and associating at least one devices with the identified set of agents, where each agent in a set of the sets of agents includes at least one common association;
  assigning each set of agents to at least one manager; and
  iteratively improving the assignment of each agent of the sets of agents to the managers until at least one desired assignment criterion is achieved, wherein the at least one criterion corresponds a to a measure of the managers ability to efficiently manage the agents; wherein the iteratively improving assignments involves testing for possible reassignments of the set of agents to the managers, calculating a gain for each possible reassignment, based on the gain for each possible assignment calculating a maximum cumulative gain, and reassigning the set of agents that contributed to the maximum cumulative gain; wherein the at least one desired assignment criterion is achieved when the maximum cumulative gain is not greater than zero and the at least one desired criterion is not violated.

39. The computer-readable storage medium of claim 38, wherein said common association represents network connectivity among the devices.

40. The computer-readable storage medium of claim 38, wherein the code further providing instruction for assigning each set of agents by:
  satisfying a predetermined size criterion among the groups.

41. The computer-readable storage medium of claim 38, wherein the code further providing instruction for:
  determining an improvement value, wherein said improvement value is a measure of a gain when at least one of the agents is selectively re-assigning to another one of the managers.

42. The computer-readable storage medium of claim 38, wherein the code further providing instruction for:
  associating each set of agents with at least one manager wherein the at least one manager has the smallest total number of agents assigned thereto.

43. The computer-readable storage medium of claim 38, wherein the code further providing instruction for:
  associating each of the sets of agent with at least one manager that results in the least amount of agent repetition.

44. The computer-readable storage medium of claim 38, wherein the desired criterion comprises the total number of agents assigned to more than one manger is less than a predetermined number.

45. The computer-readable storage medium of claim 38, wherein the desired criterion comprises the total number of agent repetitions is less than a predetermined number.

46. The computer-readable storage medium of claim 38, wherein the desired criterion comprises a distributed computation performed by the managers reaches the same result as a single manager.

47. The computer-readable storage medium of claim 38, wherein the desired criterion comprises a predetermined size criterion among the groups.

48. The computer-readable storage medium of claim 38, wherein the desired criterion comprises the determination of an elapsed predetermined period of time.

49. The computer-readable storage medium of claim 38, wherein the desired criterion comprises execution of a predetermined number of iterations.

50. The computer-readable storage medium of claim 38, wherein the code further providing instruction for:
  re-assigning agents to managers in response to changes made in the distributed system.

51. The computer-readable storage medium of claim 50, wherein the code further providing instruction for re-assigning of agents to managers by assigning newly introduced agents to one or more managers.

52. The computer-readable storage medium of claim 50, wherein the code further providing instruction for re-assigning of agents to managers by removing the assignment of any agent that has been removed from the distributed system.

53. The computer-readable storage medium of claim 50, wherein the code further providing instruction for re-assigning of agents to managers comprising:
  calculating potential re-assignments of agents to managers in a background operation; and
  applying at least some of the calculated re-assignments to the assignment of agents.

54. The computer-readable storage medium of claim 38, wherein the code further providing instruction for
  displaying the agents and their respective assignments to managers in a human-readable format.

* * * * *